April 27, 1926.
C. S. ANDERSON
LOCOMOTIVE PISTON
Filed March 5, 1924
1,582,114
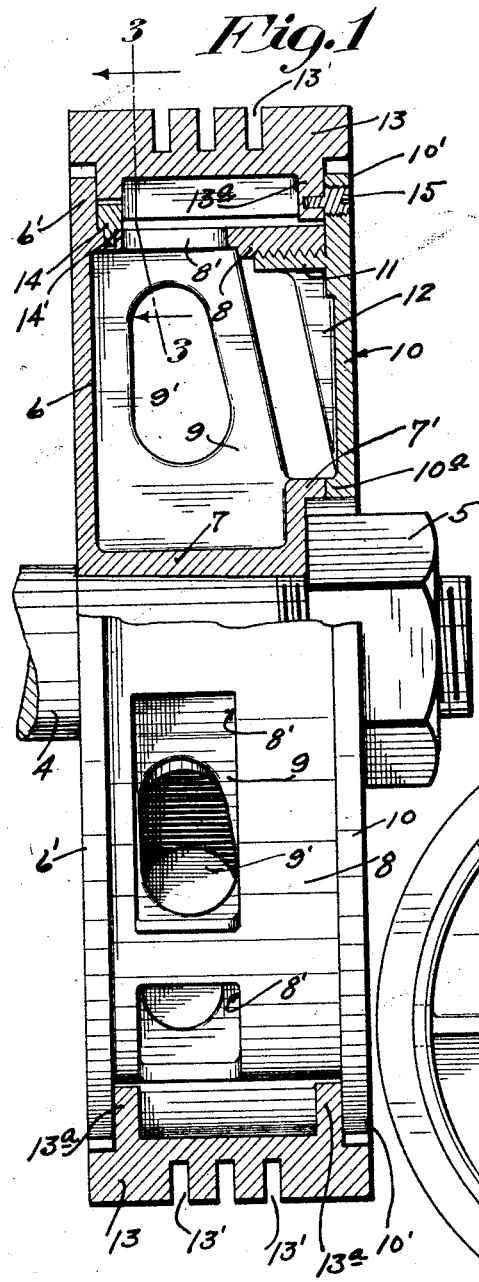
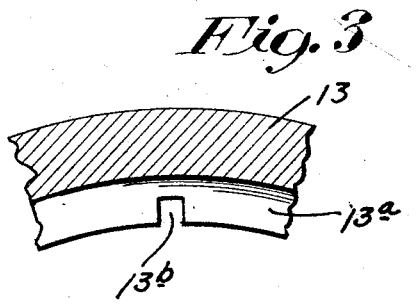
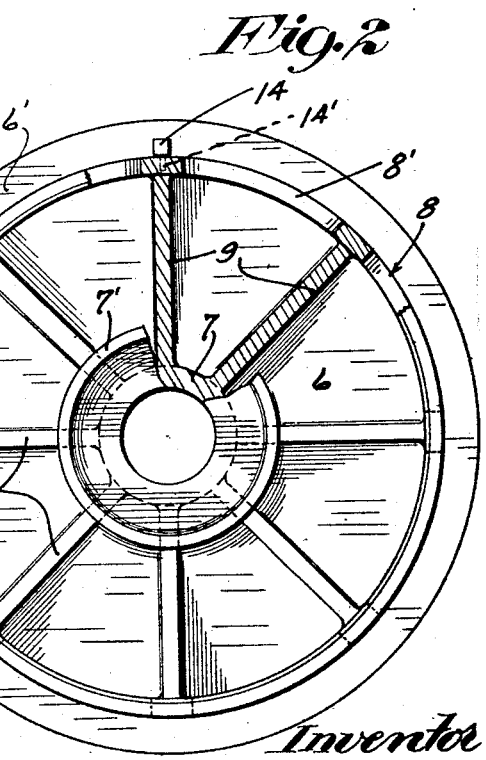
Inventor
Charles S. Anderson
By his Attorneys Patented Apr. 27, 1926.

1,582,114

UNITED STATES PATENT OFFICE.

CHARLES S. ANDERSON, OF MINNEAPOLIS, MINNESOTA, ASSIGNOR OF ONE-THIRD TO DAVID E. ANDERSON, OF ST. PAUL, MINNESOTA.

LOCOMOTIVE PISTON.

Application filed March 5, 1924. Serial No. 697,112.

*To all whom it may concern:*

Be it known that I, CHARLES S. ANDERSON, a citizen of the United States, residing at Minneapolis, in the county of Hennepin and State of Minnesota, have invented certain new and useful Improvements in Locomotive Pistons; and I do hereby declare the following to be a full, clear, and exact description of the invention, such as will enable others skilled in the art to which it appertains to make and use the same.

My invention provides highly important improvements in engine pistons and, more particularly, in the pistons used in locomotives. The older or standard types of these pistons comprise body members, usually called spiders, bull rings applied on the spiders, and follower plates holding the bull rings on the spiders, the said follower plates being secured to the spiders by machine screws or similar devices. In such arrangements, the machine screws or similar devices used to connect the follower plates to the spiders frequently become loose, allowing the follower bolts to come off, with a result that the cylinder heads are torn out or other serious and costly damage done to the pistons and cylinders.

My invention provides an improvement in the piston elements, whereby accidental displacement of the follower plates is made practically impossible and damages incident thereto are eliminated.

In the accompanying drawings, which illustrate a commercial form of the improved piston, like characters indicate like parts throughout the several views.

Referring to the drawings:

Fig. 1 is a view chiefly in horizontal axial section but with some parts in full plan showing a piston of the locomotive type designed in accordance with my invention;

Fig. 2 is a view looking at the piston from the right toward the left in respect to Fig. 1, some parts being sectioned and some parts being broken away; and Fig. 3 is a fragmentary section taken through the bull ring on the line 3—3 of Fig. 1.

The numeral 4 indicates the customary piston rod slightly threaded and tapered at its piston-receiving end and provided with the customary nut 5.

That element of the piston that is usually designated as the spider comprises a disc-like plate 6 having an axial hub or sleeve 7, and a cylindrical flange 8. The hub 7, at its extended end, has an enlarged portion 7' that clears the exterior of the nut 5 and affords a flat bearing surface for the inner face of the nut. The hub 7 and cylindrical flange 8 are cast integral with the plate 6 and the latter is concentric to said hub and is located inward of the periphery of said plate, so that the latter has an annular bull-ring-clamping flange 6' projected radially outward of said flange 8. The cylindrical flange 8, for a considerable distance inward of its outer edge, is internally threaded, and the hub 7, plate 6 and cylindrical flange 8, inward of said threads, are connected by radial reinforcing webs 9 cast integral therewith. The webs 9 are lightened by openings 9' and the cylindrical flange 8 between the webs is lightened by openings 8'.

The follower plate 10 is of annular form, being approximately of the same diameter as the follower plate 6, and is formed on its inner face with an annular boss 10ᵃ that aligns with the annular flange at the extreme portion of the enlargement 7' of the hub 7, and, of course, clears the nut 5. The follower plate 10 is provided with an annular externally threaded flange 11 that is screwed into the internally threaded portion of the cylindrical flange 8 of the follower plate 6. This flange 11 is located inward of the periphery of the follower plate 10, so that the latter is provided with a projecting portion that affords a clamping flange 10' for cooperation with the clamping flange 6' to hold the bull ring. On its inner face, the follower plate 10 is provided with tapered radial reinforcing webs 12 cast integral therewith and with the cylindrical threaded flange 11.

The bull ring 13, at its outer portion, is formed with grooves 13' to receive piston rings, not shown. The outer portion of the bull ring 13 is the full width of the distance between the outer surfaces of the spider plate 6 and the follower plate 10, but it has an inner reduced portion 13ᵃ that fits closely between the clamping flanges or portions 6' and 10'. As a simple means for securing the bull ring to the spider against rotary movements, I preferably employ a square-headed dowel 14 having a reduced cylindrical stem 14' seated in a hole bored in the cylindrical flange 8 and with its head engaged with a notch 13ᵇ formed in the inner portion of the bull ring 13.

To lock the follower plate against rotation in respect to the spider and bull ring, I have shown a lock plug 15, the body of which is externally threaded and preferably slightly tapered and screwed into a tapered hole in the clamping flange portion of the follower plate 10, and the reduced stem of which snugly fits a hole bored in the bull ring. In practice, the spider, bull ring, and follower plate will be assembled as shown in the drawings, and the latter tightly screwed up against the cylindrical flange 8, and then the holes in the follower plate and in the bull ring will be bored and the hole in the follower plate tapped for the reception of the plug. This procedure insures the application of the lock plug in a position to positively hold the follower plate in its tightly screwed-up position.

When the follower plate is screwed to position, as shown in Fig. 1, its inner portion, to wit: its annular boss 10ª, as shown, will closely engage with the large outer portion of the hub 7. Thus, the follower plate, when in position, is firmly supported both at its outer and inner portions, against the spider and, hence, cannot be flexed by high steam pressure.

A piston designed as described may be not only made at comparatively small cost, but may be made much lighter than the older forms of pistons, and its parts, assembled and locked together as described, cannot become accidentally loosened or separated. This not only eliminates accidents due to separation of the piston elements with the resulting large costs of repair and disablement of a locomotive, but provides a piston that will wear longer than the older form of piston and that will produce less wear on the cylinder.

What I claim is:

1. A piston comprising a spider having an axial sleeve-like hub and a cylindrical flange located inward of its periphery and concentrically surrounding said hub, an annular follower having a cylindrical flange located inward of its periphery and having threaded engagement with the interior of the cylindrical flange of said spider, a bull ring surrounding the cylindrical flange of said spider and clamped between those portions of the spider and follower that project radially outward of their respective cylindrical flanges, said hub having an enlarged opening adapted to clear the exterior of a nut, and said follower having an axial opening that registers with the enlarged opening of said hub and is also adapted to clear the exterior of a nut, said follower being clamped directly against the adjacent flat surfaces of the hub and cylindrical flange of said spider.

2. A piston comprising a spider having an axial sleeve-like hub and a cylindrical flange located inward of its periphery and concentrically surrounding the hub, and an annular follower having a cylindrical flange located inward of its periphery and having threaded engagement with the cylindrical flange of said spider, and a bull ring surrounding the cylindrical flange of said spider and clamped between those portions of the spider and follower plate that project radially outward of their respective cylindrical flanges, the body of said spider being in the form of a disc-like plate, and the sleeve-like hub and cylindrical flange of said spider being of substantially the same axial dimensions, said hub having an enlarged extended end adapted to clear the exterior of a nut and to afford a flat clamping surface for the inner face of a nut, and said follower having an opening with an annular boss that registers with the large flange at the end of said sleeve.

In testimony whereof I affix my signature.

CHARLES S. ANDERSON.